(No Model.)
J. W. RINGROSE.
HORSE COLLAR.
No. 412,543. Patented Oct. 8, 1889.
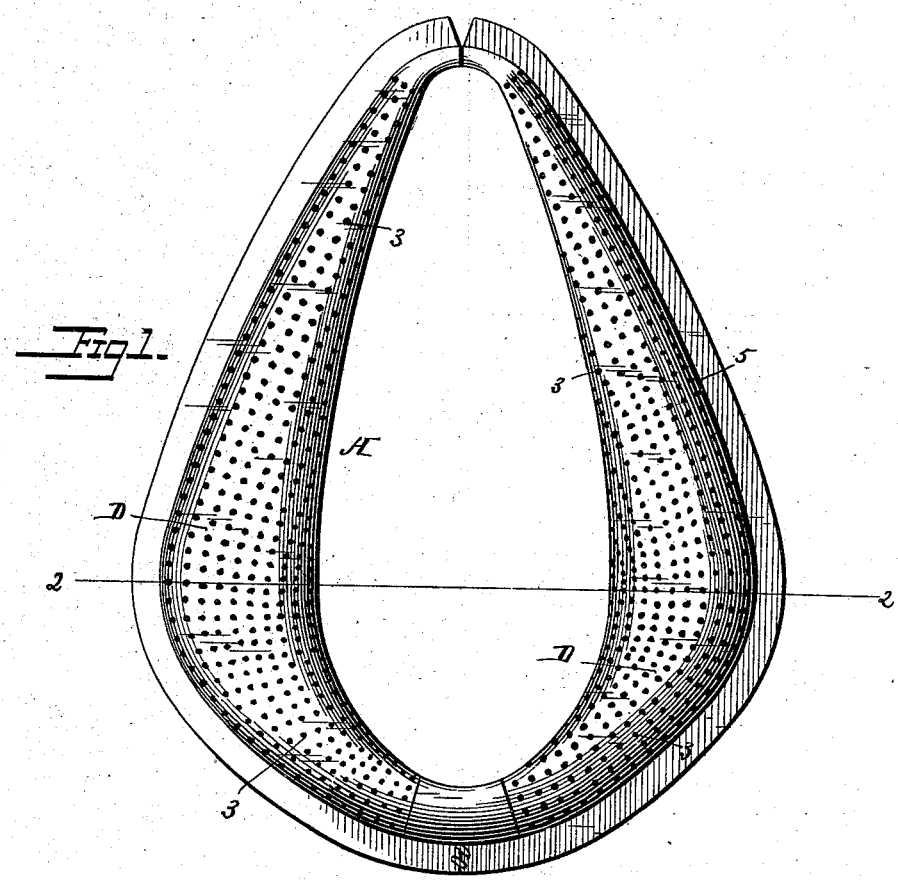
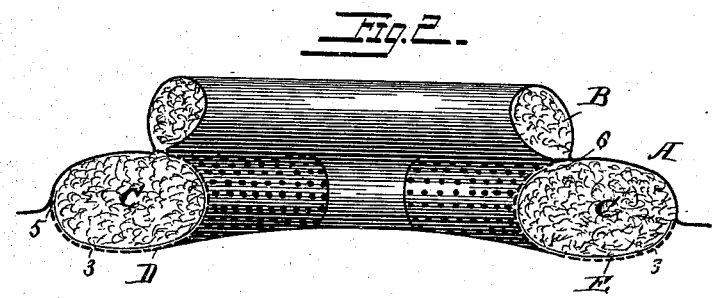
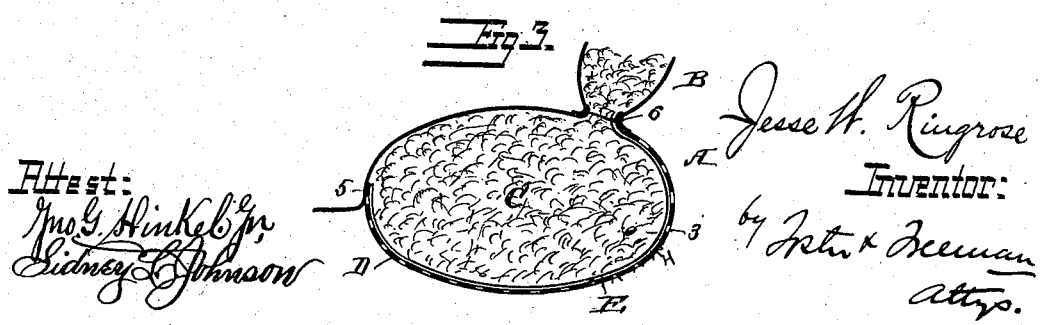
Attest:
Jno. G. Hinkel Jr.
Sidney F. Johnson
Inventor:
Jesse W. Ringrose
by Foster & Freeman
attys.

UNITED STATES PATENT OFFICE.

JESSE W. RINGROSE, OF MECHANICSBURG, PENNSYLVANIA.

HORSE-COLLAR.

SPECIFICATION forming part of Letters Patent No. 412,543, dated October 8, 1889.

Application filed August 18, 1887. Serial No. 247,283. (No model.)

*To all whom it may concern:*

Be it known that I, JESSE W. RINGROSE, a citizen of the United States, and a resident of Mechanicsburg, Cumberland county, Pennsylvania, have invented certain new and useful Improvements in Horse-Collars, of which the following is a specification.

Heretofore it has been proposed to relieve the tendency that horse-collars have to hold the perspiration of the horse, and thus cause sore shoulders, by various devices, chief of which may be mentioned making the collar of coarse duck cloth and providing a pad consisting of pieces of perforated buckskin and leather, so formed as to be used under the ordinary collar and against the horse's shoulder. The latter device is a thing separate from the collar and not capable of use for draft purposes without a collar. Its use necessitates the handling of additional articles in harnessing a horse, tends to take the collar proper from its most advantageous position on the horse's shoulder, and increases or adds an additional pad or cushion to the cushion already formed by the collar, without necessity therefor.

The present invention is directed to the provision of a draft-collar forming in a single article the collar, its cushion, and a contacting surface adapted to absorb the perspiration of the horse from its shoulder, as well as to take up the grit and dust accumulating under the collar, so that the shoulder is, in fact, constantly cleaned thereby and soreness prevented.

To this end the invention consists in the improved horse-collar now to be particularly described.

In the drawings, Figure 1 is a rear elevation of a horse-collar provided with this invention. Fig. 2 is a horizontal cross-sectional elevation of the same, taken on the line 2 2 of Fig. 1; and Fig. 3 is an enlarged sectional detail of a portion of the rear of the collar.

Referring to said drawings, it is to be understood that A represents a horse draft-collar of the ordinary kind so far as shape and construction are concerned, having a seat B for the hames and the cushion or padding C, of hair, straw, and the like, forming a more or less soft bearing for the horse's shoulder and the adjacent portions of his neck. It is usual to form the covering for this cushion (of hair, straw, and the like) of soft leather, ticking, and other fabrics, according to the quality of the collar being made. Of whatever material this covering consists, it is of such a nature as to rub the grit and dust accumulating under it and on the horse's shoulder into his skin, which, together with the perspiration, produces sores which incapacitate the horse for work. In order to overcome this effect of horse-collars and to provide a covering for the bearing-surface of the afterwale of the pad or cushion of the collar which will absorb the perspiration and take up the grit and dust from the shoulder instead of rubbing it into the skin, I employ a leather covering D, perforated with holes 3, over its entire surface, as shown in Figs. 1 and 2. This leather covering extends from the side of the front section of the collar at 5 around to a point 6, and is perforated from point to point, as shown, so that not only is the shoulder affected and benefited thereby, but the adjacent portions of the neck also. Thus the entire surface of the horse's skin upon which the collar will bear or contact with will be equally affected by the perforated leather covering. This leather covering having considerable thickness in contradistinction to a fabric, and being stiff, there will be no tendency of the leather becoming soft enough and pressed down enough to close the perforations therein when the collar is in use; but the effect of this perforated collar will be constantly brought to use for the purpose of taking up the grit and dust, and thereby cleaning the horse's shoulder and the adjacent parts by the tendency of the edges of each perforation, as they collectively rub over the skin, to collect the grit in the perforations, taking it away from the skin and preventing the solid portions of the covering D between the perforations from having any rubbing effect.

In order to better absorb the sweat from the horse in contact with the collar and to prevent the passage of the dust and grit into the interior of the collar, I provide this perforated leather covering D with an inner lining E, formed of some absorbent cloth or equivalent material, which lies tightly stretched behind and in contact with said covering, and as the sweat will rise first before the action of the perforations in taking up the grit, it will pass through said perforations and be completely absorbed by said lining. Of course the perforations should be cleaned after use of the collar or before being employed again, so as to free them of the grit and dust previously accumulated therein, so that their action will be as efficient as when first used. This can readily be done by brushing the perforated surface of the covering with a stiff brush, as the cloth over the bottoms of the holes will assist in the operation by retaining the dust and grit until acted upon by the bristles of the brush. While the perforations are shown as straight-sided, it is to be observed that they may be inclined, as at 4, Fig. 3, forming conical perforations, which can be more easily freed of grit.

What I claim is—

1. The herein-described horse-collar, the covering for the bearing-surface of the afterwale, which is perforated, and a lining of absorbent material secured directly in contact with the interior of said covering, whereby the sweat is absorbed and the grit and dust prevented from entering the interior of the collar, substantially as described.

2. The herein-described horse-collar, the covering for the bearing-surface of the afterwale, which is provided with conical perforations, and a lining of an absorbent material secured directly in contact with the interior of said covering, substantially as described.

In testimony whereof I have signed my name to this specification in the presence of two subscribing witnesses.

JESSE W. RINGROSE.

Witnesses:
J. N. YOUNG,
J. L. SHELLEY.